(12) United States Patent
Connelly et al.

(10) Patent No.: US 7,543,666 B2
(45) Date of Patent: Jun. 9, 2009

(54) BATTERY MOUNT

(75) Inventors: Richard M. Connelly, Washington, MI (US); Kevin L. Young, Chesterfield, MI (US); Khaja A. Ahmed, Rochester Hills, MI (US); Dennis F. Stedman, Ortonville, MI (US)

(73) Assignee: Chrysler LLC, Auburn Hills, MI (US)

( * ) Notice: Subject to any disclaimer, the term of this patent is extended or adjusted under 35 U.S.C. 154(b) by 441 days.

(21) Appl. No.: 11/539,313

(22) Filed: Oct. 6, 2006

(65) Prior Publication Data

US 2008/0093236 A1 Apr. 24, 2008

(51) Int. Cl.
*B60R 16/04* (2006.01)

(52) U.S. Cl. ...................... 180/68.5; 248/503
(58) Field of Classification Search ............... 180/68.5; 248/500, 503
See application file for complete search history.

(56) References Cited

U.S. PATENT DOCUMENTS

| | | | |
|---|---|---|---|
| 1,734,645 A | 11/1929 | Polland | |
| 2,009,199 A * | 7/1935 | Pehotsky | 180/68.5 |
| 2,031,508 A * | 2/1936 | Scott | 180/68.5 |
| 2,453,835 A | 11/1948 | Donkin | |
| 2,588,870 A | 3/1952 | Pittman | |
| 2,994,395 A | 8/1961 | Hall | |
| 3,003,573 A * | 10/1961 | Lorenz | 180/68.5 |
| 3,903,981 A * | 9/1975 | Peterson | 180/68.5 |
| 4,515,233 A * | 5/1985 | Silverstein | 180/68.5 |
| 4,682,751 A | 7/1987 | Tamas et al. | |
| 4,779,692 A * | 10/1988 | Hagarty et al. | 180/68.5 |
| 4,854,540 A * | 8/1989 | Balek | 248/503 |
| 5,086,860 A | 2/1992 | Francis et al. | |
| 5,536,595 A * | 7/1996 | Inkmann et al. | 429/120 |
| 5,823,502 A | 10/1998 | Greiner et al. | |
| 6,102,356 A | 8/2000 | Huntley et al. | |
| 6,161,810 A | 12/2000 | Crow et al. | |
| 6,186,256 B1 * | 2/2001 | Dignitti | 180/68.5 |
| 6,827,169 B1 | 12/2004 | Van Hout et al. | |
| 6,871,829 B2 * | 3/2005 | Shannon, Jr. | 248/505 |
| 7,350,610 B2 * | 4/2008 | Kikuchi | 180/68.5 |

* cited by examiner

*Primary Examiner*—Christopher P Ellis
*Assistant Examiner*—Brian Swenson
(74) *Attorney, Agent, or Firm*—Ralph E. Smith (57) ABSTRACT

A tray has a bottom panel for supporting a battery. An inner panel projects upwardly from the bottom panel to provide an inner locator for the battery. A retainer holds the battery down on the bottom panel. A lock member for the retainer is moveable from an unlocking position to a locking position, and when moved to the locking position forces the retainer inwardly. The retainer has an abutment engageable with the battery to move the battery inwardly against the upright panel when the retainer is moved inwardly. Two fulcrum points in the retainer cause a vertical force to hold the battery in place by a lever effect of the lock member and fulcrum points.

20 Claims, 7 Drawing Sheets

BATTERY MOUNT

FIELD OF THE INVENTION

The present invention relates to battery mounts, and more particularly to a battery mount having clamping apparatus for securing the battery on a tray.

BACKGROUND OF THE INVENTION

Mounting and retaining a battery in place in an automotive vehicle has been both difficult and time consuming. A battery is a heavy and unwieldy component causing noise and vibrations if not held down properly in a vehicle. The available space for mounting the battery is limited. In the past batteries were placed in the engine compartment. In this situation, the battery is placed in the fender compartment outside the enginebox forward of the left wheel well. Also, the battery is held down and against an upright panel using two point loading clamping apparatus. This was needed for space constraints, and to hold tight and locate the battery in the vehicle.

SUMMARY OF THE INVENTION

In accordance with the present invention a battery mounting system includes a cantilevered member comprising a tray having an upright panel mounted to the automobile frame and a bottom panel adapted to support the battery. Clamping apparatus is provided for securing the battery on the bottom panel against the upright panel of the tray. The clamping apparatus preferably comprises of dual point vertical and horizontal loading featured retainer spanning across the battery and top of one side, and a formed rod spanning along the top and one side, snapping into the retainer. The retainer preferably has a locking feature for the rod to stay in place for shipping and can be installed and unlocked for further fastening into the retaining position with one hand.

Preferably the rod when moved from the shipping position to a retaining position moves the retainer inwardly, consequently moving the battery inwardly against the upright panel. A laterally outward projection or bump-out on the upright panel serves as a cross-car locator for the battery.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
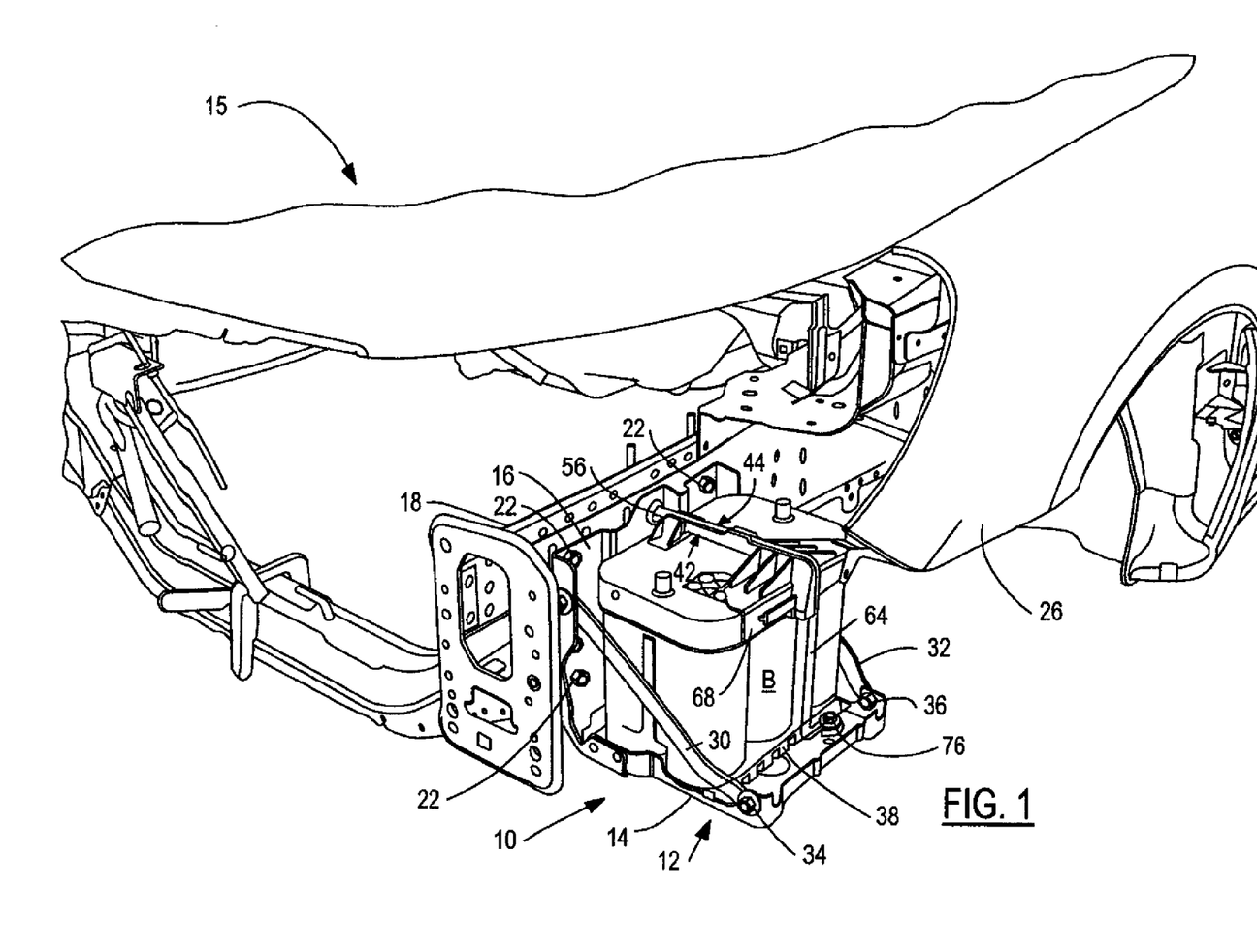
FIG. 1 is a fragmentary perspective view of a battery mount constructed in accordance with the invention, shown in the engine compartment of an automotive vehicle.
Figures 2, 3:
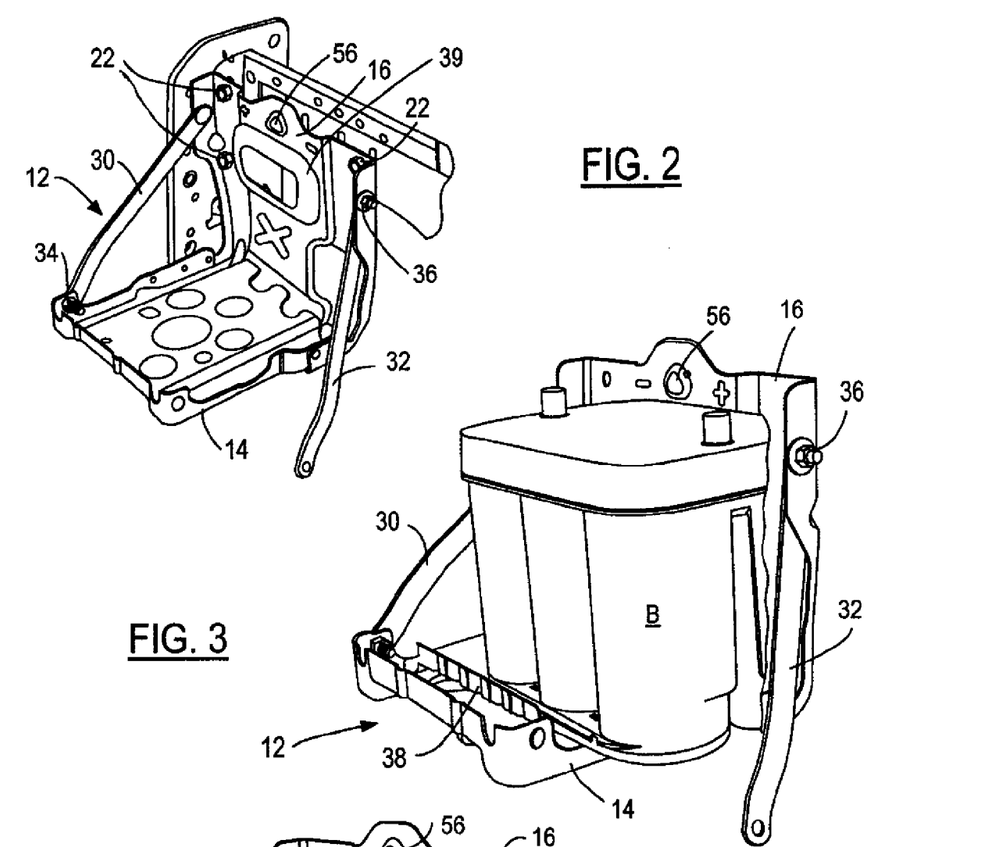
FIG. 2 is a perspective view of the battery mount showing one of the struts supporting the bottom panel of the tray in a partially detached position.
FIG. 3 is a view similar to FIG. 2, showing a battery being loaded onto the bottom panel of the tray.
Figure 4:
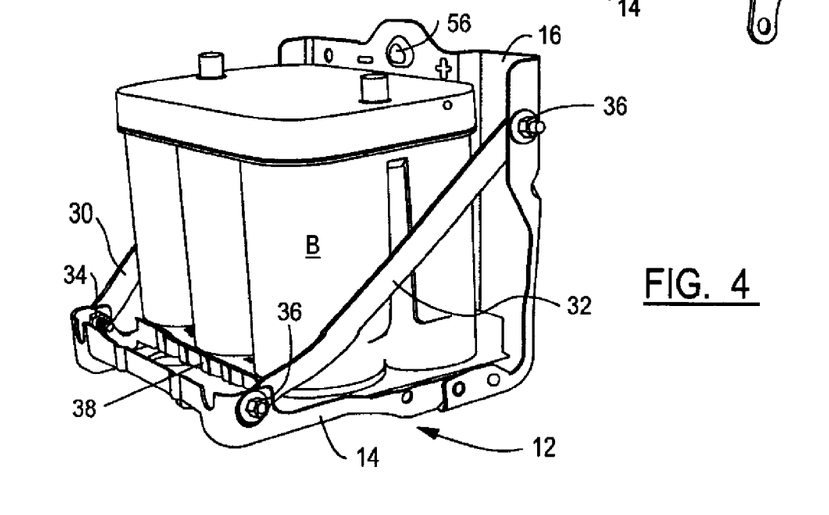
FIG. 4 is a view similar to FIG. 3, showing the battery fully loaded onto the bottom panel of the tray, with both struts attached to both the bottom panel and the inner panel of the tray.
Figure 5:
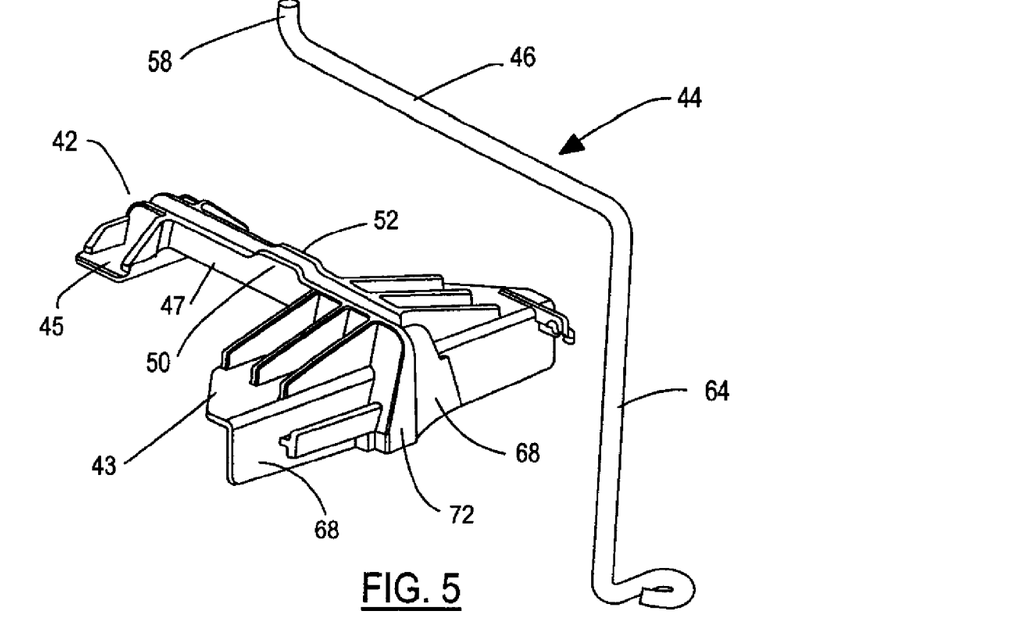
FIG. 5 is an exploded view showing the battery retainer and the lock member.

Referring now more particularly to the drawings, and especially FIG. 1, a battery mount 10 includes a tray 12 made of metal or any relatively rigid material. The tray has a bottom, generally horizontal panel 14 and an upright, generally vertical panel 16 projecting upwardly from the laterally inner edge of the bottom panel. The tray 12 is shown as being mounted in the engine compartment of an automotive vehicle 15, with the upright panel 16 of the tray bolted or otherwise secured to a rigid longitudinally extending side frame member 18 of the vehicle by fasteners 22. The tray is supported behind the front bumper of the vehicle on the laterally outer side of the side frame member 18 in a position between the side frame member and a side quarter panel 26 of the vehicle body, with the bottom panel 14 of the tray extending laterally outwardly from the upright panel 16 toward the quarter panel.

Referring to FIGS. 1 and 2-4, front and rear struts 30 and 32 extend from the upper edge of the upright panel 16 to the laterally outer edge of the bottom panel 14. Fasteners, here shown as nut and bolt assemblies 34 and 36, releasably secure the ends of the struts 30 and 32 to the upright panel 16 and to the bottom panel 14.

A battery B is supported on a pad 38 which rests on the top surface of the bottom panel 14. The pad 38 separates the battery B from the bottom panel 14 of the tray 12 and is adapted to collect or manage battery acids which may leak from the battery and corrode the tray. The pad 38 may be made of a polymer or any other material suitable for the purpose.

Referring to FIGS. 1, 5, 6 and 11-16, the battery B is clamped down on the bottom panel 14 up against a laterally outward projection or bump-out 39 of the upright panel 16 by clamping apparatus 40 including a retainer 42 which is adapted to be placed on the top of the battery, and a lock member 44. The retainer 42 includes an outer clamp 43 and an inner clamp 45 spaced from and connected to the outer clamp by a bar 47. The clamps 43 and 45 are adapted to bear down on the battery with a vertical clamping force. The lock member 44 comprises an elongated rod 46. The retainer 42 has a rod holder formed by spaced apart ridges 50 and 52 on the bar 47 that may be integral with the bar and together form a channel 54 which rotatably receives the rod 46.

The inner end of the rod 46 is adapted to extend through a self-locating triangular opening 56 in the upright panel 16 of the tray (see FIGS. 1 and 6) and is bent at a right angle to form a transverse hook 58 that is adapted to engage the laterally inner side of the upright panel 16 as explained more fully hereinafter. An acute angle at the top of the opening 56 locates the rod 46 laterally. The bar 47 of the retainer 42 has a recess 60 beneath the channel 54 (see FIGS. 13, 15 and 16). To install the rod 46 in the channel 54, the rod may be slid into the channel hook end first in a laterally inward direction by holding the rod at an angle to the retainer so that the recess 60 clears the hook 58 as it initially enters the channel (see FIG. 15). Then the rod 46 can be straightened during further entry into the channel 54 so that it extends lengthwise within the channel. Alternatively, the rod 46 may be installed in the channel 54 by holding it horizontally above and parallel to the channel and snapping it down vertically into the channel 54 between the ridges 50 and 52.

Figure 9:
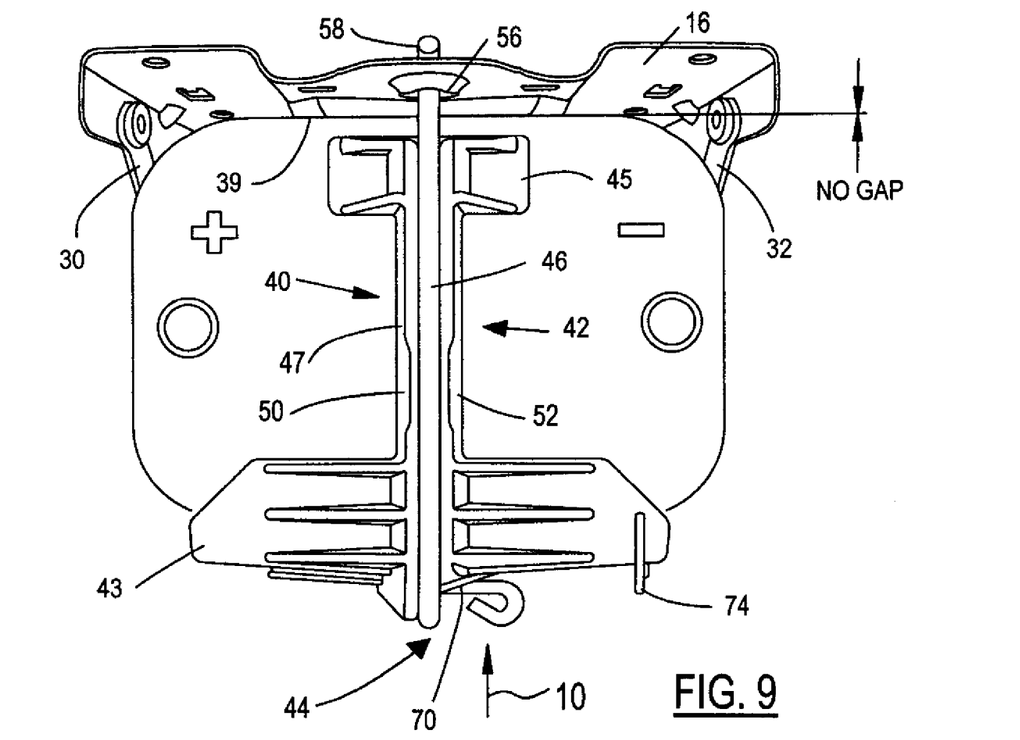
FIG. 9 is a view similar to FIG. 7 but shows the position of the battery after it has been moved rearwardly against the inner panel of the tray.
Figure 10:
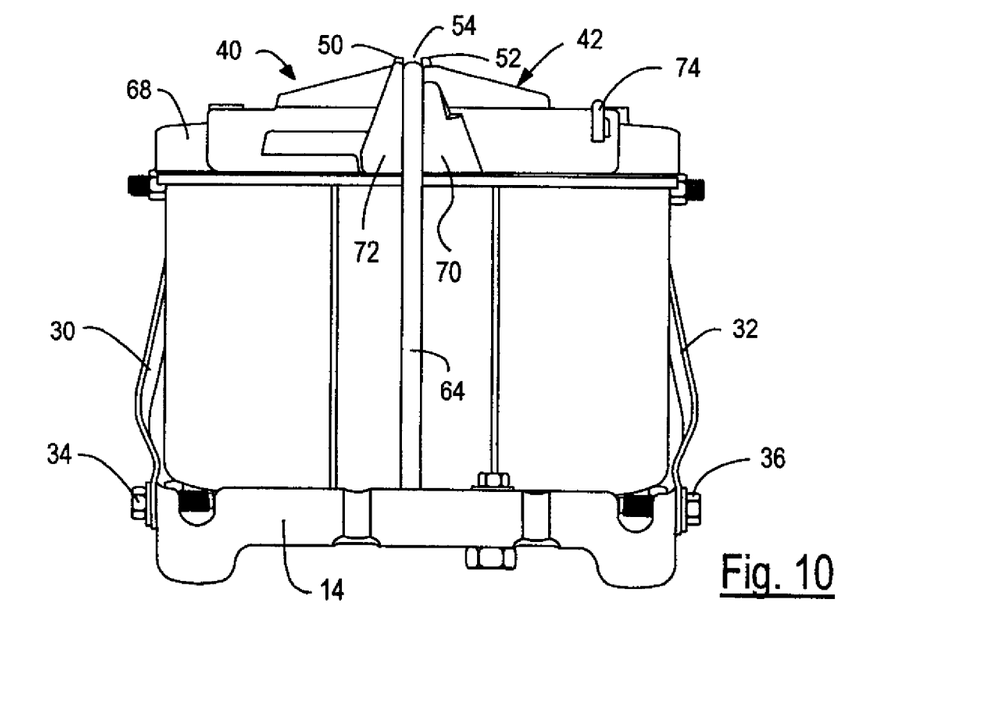
FIG. 10 is a view looking in the direction of the arrow 10 in FIG. 9.
Figures 11, 12, 13, 14:
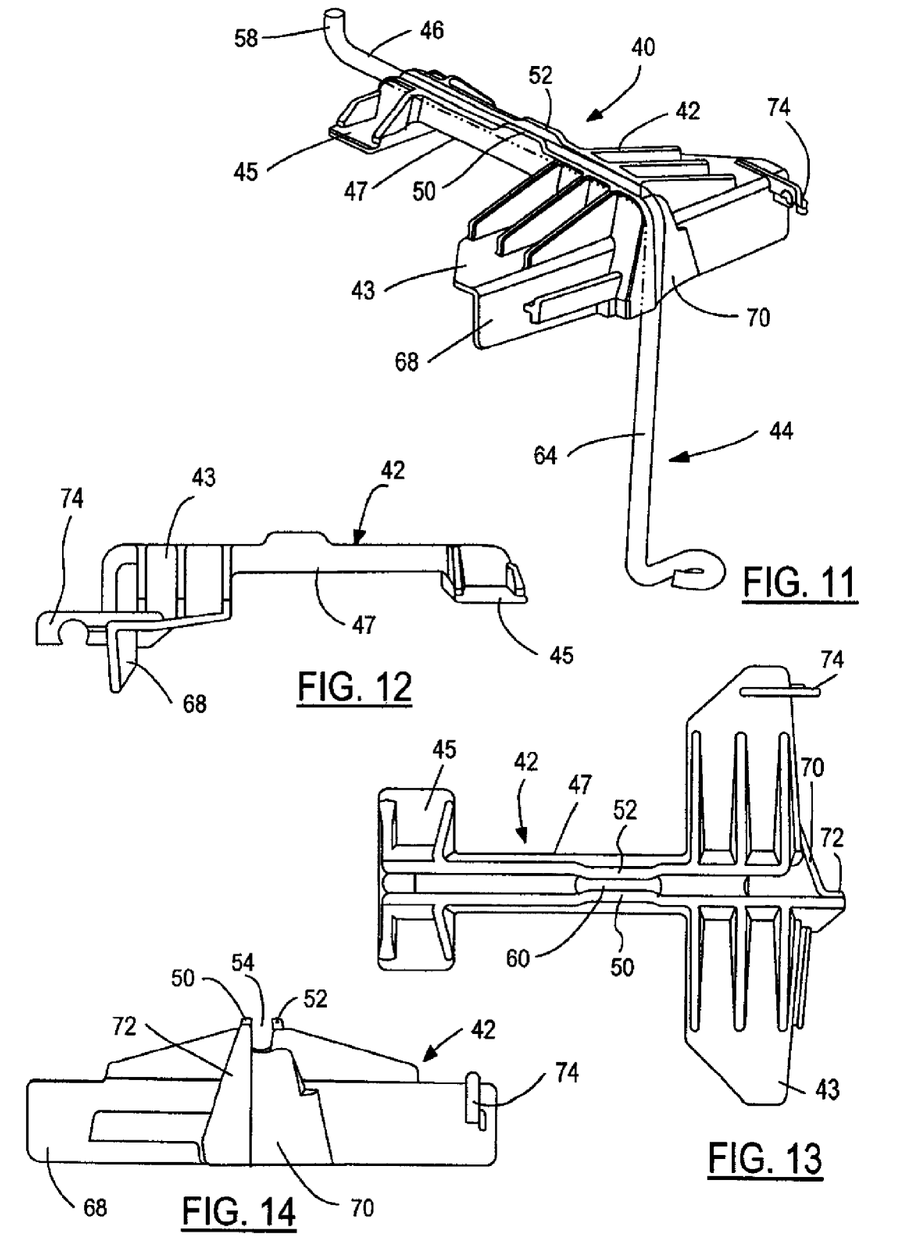
FIG. 11 is a perspective view showing the lock member assembled with the battery retainer.
FIG. 12 is a side view of the retainer.
FIG. 13 is a top view of the retainer.
FIG. 14 is a front view of the retainer.
Figure 15:
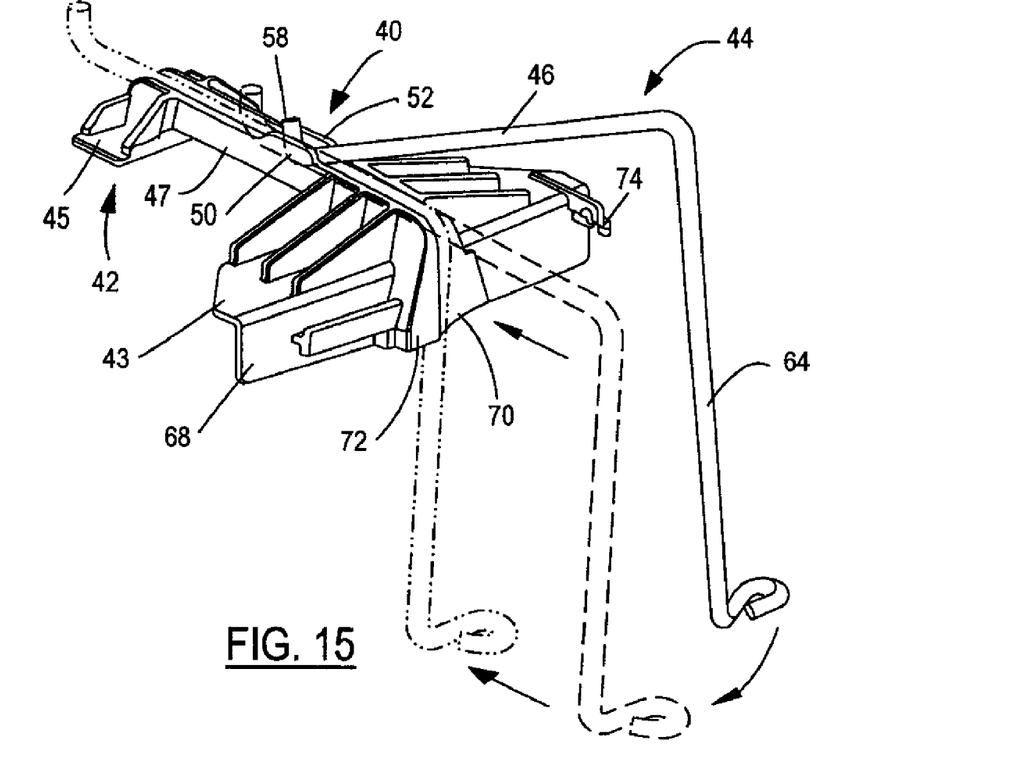
FIG. 15 is a view similar to FIG. 11 but shows the lock member in various positions during its assembly with the retainer.
Figure 16:
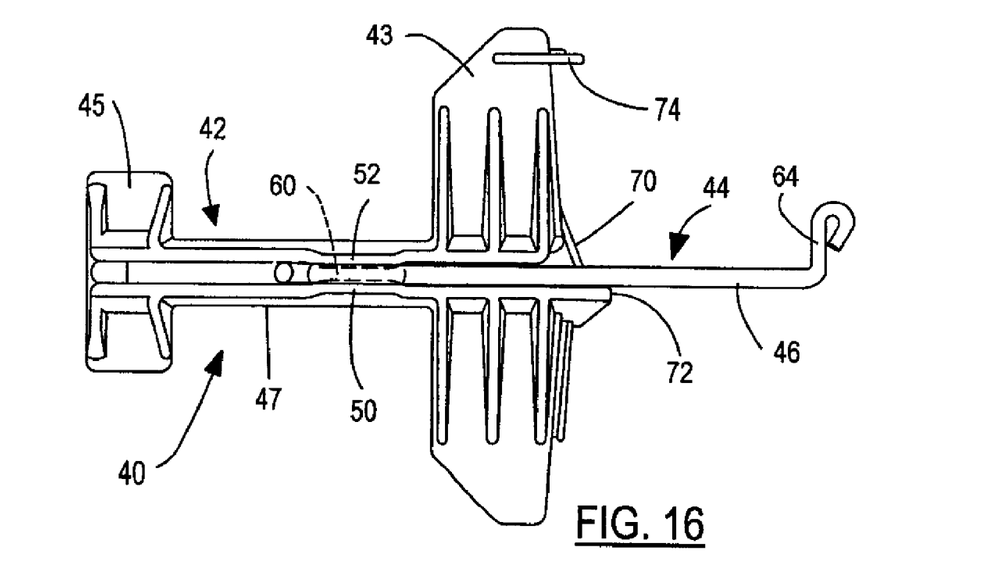
FIG. 16 is a top view of the retainer showing the lock member assembled therewith.

The outer end of the rod 46 is bent at a right angle to form a crank handle 64 which may be used to manually rotate the rod from an unlocking position shown in FIGS. 6-8 and 11 to a locking position shown in FIGS. 1, 9 and 10.

Figure 6:
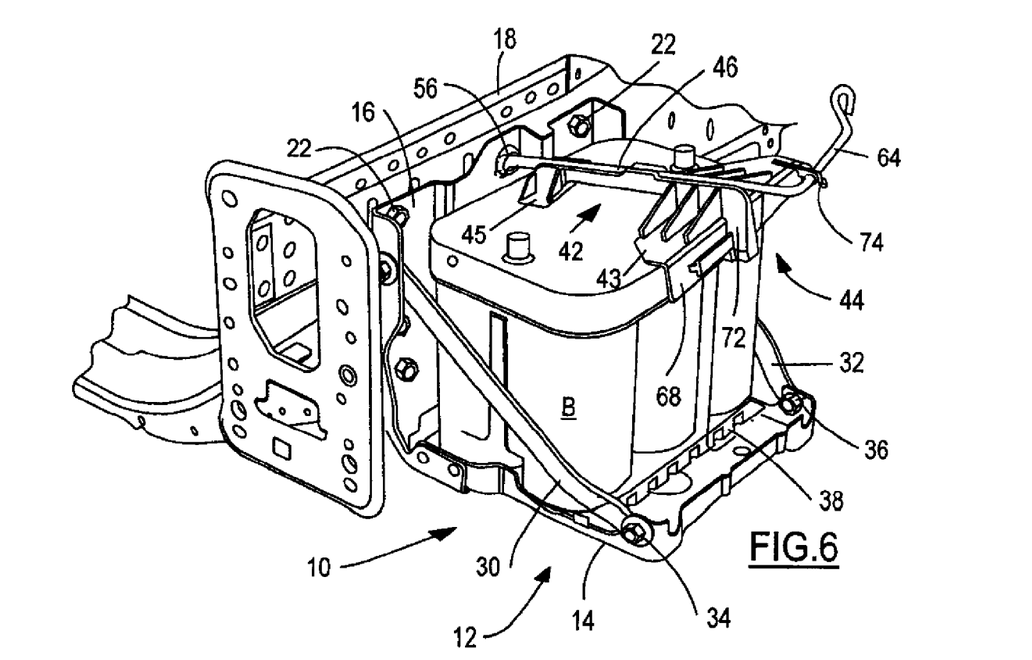
FIG. 6 is a perspective view showing the battery supported on the tray and the retainer and lock member on the top surface of the battery.
Figure 7:
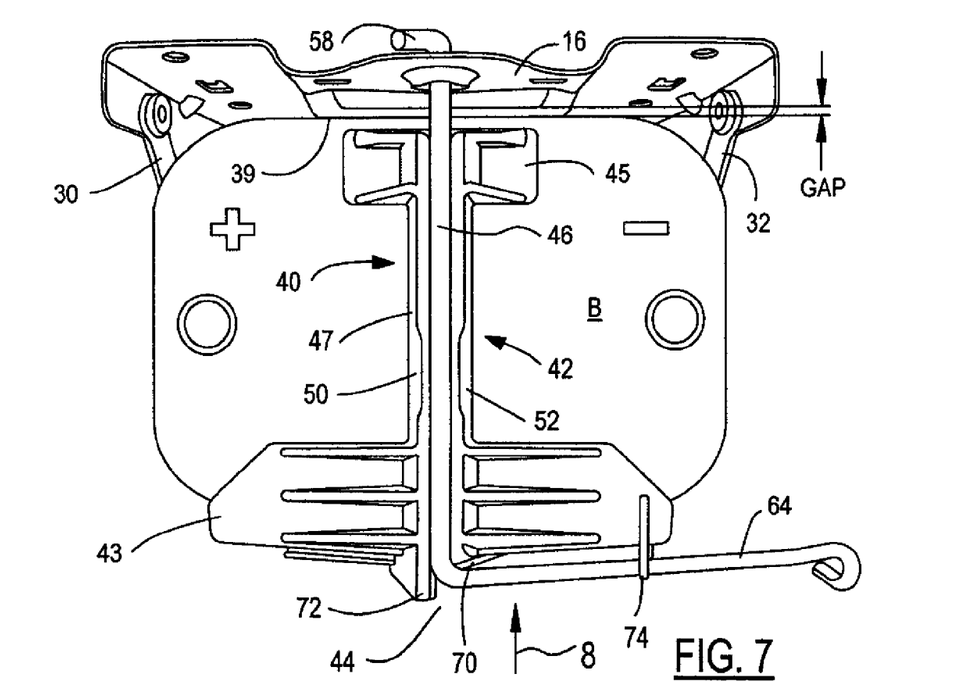
FIG. 7 is a top view showing the battery supported on the tray before the battery is pushed back against the inner panel of the tray.
Figure 8:
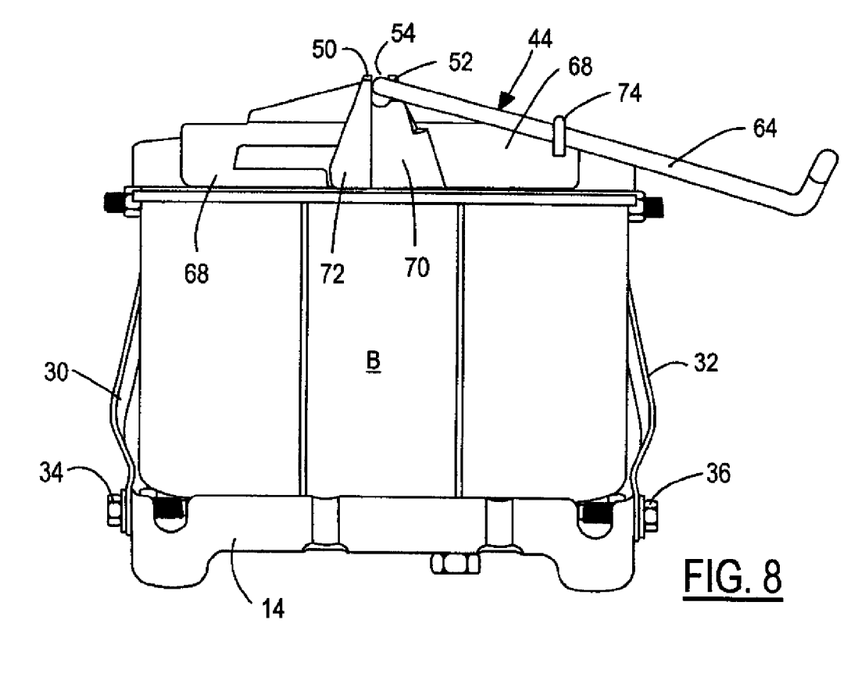
FIG. 8 is a view looking in the direction of the arrow 8 in FIG. 7.

The clamp 43 of the retainer 42 has a vertically downwardly extending flange forming an abutment 68 at its laterally outer extremity which overlaps the laterally outer face of the battery (see FIGS. 1, 6 and 10).

The clamp 43 of the retainer 42 has a slanted wedge surface 70 on its laterally outer end (see FIGS. 7-11, 13 and 14). The crank handle 64 slides over the wedge surface 70 with a camming action when the rod 46 is rotated from its unlocking position to its locking position, to drive the retainer 42 laterally inwardly as more fully explained hereinafter. The inner end of the rod 46 can rotate in the opening 56 and the hook 58 prevents the inner end of the rod from pulling out of the opening in all rotative positions of the rod. The retainer 42 has a rib 72 at the high end of the wedge surface 70 to provide a stop which is contacted by the crank handle 64 to prevent the crank handle from rotating beyond the locking position of the rod 46.

The end of the crank handle 64 is releasably secured to a clip 74 (see FIGS. 5, 6, 11 and 12) on the clamp 43 of the retainer 42 when the rod is in the unlocking position. The crank handle 64 can be secured to the bottom panel 14 by a fastener 76 to retain the rod in the locking position.

In order to install the battery B on the tray 12, the nut and bolt assembly 36 securing the strut 32 to the bottom panel 14 is removed, permitting the strut 32 to swing downward to a vertical position. The pad 38 is then placed upon the bottom panel 14 and the battery is placed upon the pad by moving the battery forwardly through the space previously occupied by the strut 32.

The retainer 42, with the rod 46 disposed in the channel 54 of the retainer, is placed upon the top surface of the battery. When placing the retainer 42 on the battery, the retainer is manipulated to extend the rod 46 laterally inwardly through the self-locating triangular opening 56 in the upright panel 16 of the tray so that the hook 58 engages the inner side of the upright panel and prevents the rod from pulling away from the upright panel. The rod 46 is laterally located by being engaged in the angle at the top of the opening 56. At this time, the rod 46 is in the unlocking position with the crank handle releasably retained by the clip 74, and the abutment 68 on the clamp 43 of the retainer 42 overlapping the laterally outer face of the battery.

The installer may then rotate the rod 46 from its unlocking position to its locking position. The crank handle 64 is used for this purpose and readily releases from the clip 74. As the rod 46 is rotated to the locking position, the crank handle 64 slides over the wedge surface 70 on the clamp 43 of the retainer 42 with a camming action to move the retainer laterally inwardly. The inward movement of the retainer 42 causes the abutment 68 to engage the outer face of the battery and move the battery laterally inwardly against the bump-out 39 of the upright panel 16 of the tray to provide a cross-car locator for the battery. The upright panel 16 thus serves as a locator for the battery.

In the past, it has been very difficult to position and properly locate a battery on a tray without using both hands, particularly because of the limitations of available space. The present invention makes it possible, after the battery is initially placed on the tray, to properly locate and secure the battery, requiring only one hand to turn the crank handle.

Finally the strut 32 is reattached to the bottom panel 14 by applying the nut and bolt assembly 36, and the crank handle 64 is secured to the bottom panel 14 by the fastener 76 to retain the rod 46 in the locking position.

The battery, when secured on the tray 12 by the clamping apparatus 40 of this invention, is held down on the bottom panel 14 by the vertical force caused by the lever effect of the rod 46 and fulcrum points of the clamps 43 and 45 of the retainer 42 and is pressed against the upright panel 16 by the horizontal clamping force of the abutment or flange 68 on the clamp 43 of the retainer, thus providing dual point loading. The vertical and horizontal clamping forces create a resultant diagonal clamping force on the battery running from the juncture of the clamp 43 and abutment 68 of the retainer 42 downwardly and laterally inwardly to the intersection of the bottom and upright panels 14 and 16 of the tray 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A battery mount comprising:

a tray having a bottom panel adapted to support a battery, an inner panel projecting upwardly from the bottom panel to provide an inner locator for the battery when the battery is supported on the bottom panel, and clamping apparatus for securing the battery on the bottom panel against the inner panel of the tray, said clamping apparatus comprising a retainer for the battery, a lock member for the retainer moveable from an unlocking position to a locking position, said lock member when moved from the unlocking position to the locking position moving the retainer inwardly, said retainer having an abutment engageable with the battery to move the battery inwardly against the upright panel when the retainer is moved inwardly by movement of the lock member to the locking position, and said lock member when in the locking position holding the retainer down on the battery to clamp the battery to the bottom panel.

2. The battery mount of claim 1, wherein the inward movement of said retainer is caused by a part of said lock member engaging a wedge surface of said retainer with a camming action during the movement of said lock member from the unlocking position to the locking position.

3. The battery mount of claim 1, further including a pad positioned on the bottom panel to protect the bottom panel from leakage of acids from the battery.

4. A battery mount for mounting a battery on a rigid frame member of an automotive vehicle between the frame member and a side panel of the vehicle, comprising:
a tray having a bottom panel adapted to support the battery,
an inner panel projecting upwardly from the bottom panel to provide an inner locator for the battery when the battery is supported on the bottom panel, and
clamping apparatus for securing the battery on the bottom panel against the inner panel of the tray,
said clamping apparatus comprising a retainer for the battery,
a lock member comprising a rod,
a rod holder supporting said rod for axial rotation,
said rod extending across the retainer to hold the retainer down on the battery to thereby clamp the battery to the bottom panel,
said rod having a crank handle for rotating the rod from an unlocking position to a locking position,
said retainer having a wedge surface,
said crank handle being adapted to engage said wedge surface with a camming action when the rod is rotated to said locking position to drive the retainer inwardly, and
said retainer having an abutment engageable with the battery to move the battery inwardly against the upright panel when the retainer is driven inwardly by the camming action of the rod handle on the wedge surface when the rod is rotated.

5. The battery mount of claim 4, wherein said upright panel has an opening, said rod has an inner end rotatably received in said opening, and said inner end of said rod has a hook engaging an inner side of the upright panel to prevent the rod from pulling out of the opening.

6. The battery mount of claim 4, wherein said crank handle is disposed at an outer end of said rod and extends at a substantial angle to said rod, and said retainer has a rib providing a stop positioned to be engaged by the crank handle to prevent the crank handle from rotating beyond the locking position of the rod.

7. The battery mount of claim 6, further including a fastener for releasably securing the crank handle to the bottom panel when said rod is in said locking position.

8. The battery mount of claim 7, further including a clip on said retainer releasably holding said crank handle when said rod is in the unlocking position.

9. The battery mount of claim 8, wherein said rod holder comprises a channel formed by spaced apart ridges on said retainer, and said channel has a gap between the ridges enabling said rod to be snapped into and out of said channel through said gap.

10. The battery mount of claim 8, wherein said rod holder comprises a channel carried by said retainer and rotatably receiving said rod, said upright panel has an opening, said rod has an inner end rotatably received in said opening, said inner end of said rod has a transverse hook engaging an inner side of said upright panel to thereby retain said inner end of said rod engaged with said upright panel in both the locking position and the unlocking position of said rod, and said retainer has a recess adjacent to said channel to clear said hook when manipulating said rod during installation of said rod in said channel and removal of said rod from said channel to facilitate such installation and removal.

11. A battery mount for mounting a battery on a rigid frame member of an automotive vehicle between the frame member and a side panel of the vehicle, comprising:
a tray having a bottom panel adapted to support the battery,
an inner panel projecting upwardly from the bottom panel to provide an inner locator for the battery when the battery is supported on the bottom panel, and
clamping apparatus for securing the battery on the bottom panel against the inner panel of the tray,
said clamping apparatus comprising a retainer for the battery,
a lock member comprising a rod,
said rod having an inner end rotatably received in an opening in the upright panel,
the inner end of the rod having a transverse hook engageable with an inner side of the upright panel to prevent the inner end of the rod from pulling out of the opening,
said rod being rotatably received in a channel in the retainer to hold the retainer down on the battery to thereby clamp the battery to the bottom panel,
said rod having a crank handle for rotating the rod from an unlocking position to a locking position,
said retainer having a wedge surface,
said crank handle being adapted to engage said wedge surface with a camming action when the rod is rotated to said locking position to drive the retainer inwardly, and
said retainer having an abutment engageable with the battery to move the battery inwardly against the upright panel when the retainer is driven inwardly by the camming action of the rod handle on the wedge surface when the rod is rotated.

12. The battery mount of claim 11, wherein said crank handle is disposed at an outer end of said rod and extends at a substantial angle to said rod, and said retainer has a rib providing a stop positioned to be engaged by the crank handle to prevent the crank handle from rotating beyond the locking position of the rod.

13. The battery mount of claim 12, further including a fastener for releasably securing the crank handle to the bottom panel when said rod is in said locking position.

14. The battery mount of claim 13, further including a clip on said retainer releasably holding said crank handle when said rod is in the unlocking position.

15. The battery mount of claim 14, wherein the channel is formed by integral spaced apart ridges on said retainer, and said channel has a gap between said ridges enabling said rod to be snapped into and out of said channel through said gap.

16. The battery mount of claim 14, wherein said retainer has a recess adjacent to said channel to clear the hook when manipulating said rod during installation of said rod in said channel and removal of said rod from said channel to facilitate such installation and removal.

17. The battery mount of claim 16, wherein said upright panel has an outward projection engageable with the battery to provide a cross-car locator for the battery.

18. The battery mount of claim 16, wherein the opening in said upright panel is generally triangular and has an angle at the top of the opening to self-locate the rod laterally.

19. The battery mount of claim 18, wherein said retainer has spaced apart clamps providing fulcrum points adapted to bear down on the battery with a dual vertical clamping force.

20. The battery mount of claim 18, wherein said retainer has spaced apart clamps providing fulcrum points adapted to bear down on the battery with a vertical clamping force, and the abutment presses against the battery with a horizontal clamping force, thus providing dual point vertical and horizontal loading, and wherein the vertical and horizontal forces create a resultant diagonal clamping force.

* * * * *